Patented Jan. 19, 1954

2,666,527

UNITED STATES PATENT OFFICE 2,666,527

METHOD OF PROMOTING FILTRATION

C. Lynn Peterson, Salt Lake City, Utah, assignor to Peterson Filters and Engineering Company, Salt Lake City, Utah, a corporation of Utah No Drawing. Application June 22, 1945, Serial No. 601,079

1 Claim. (Cl. 210—62)

This invention relates to the filtration art and more particularly relates to the filtration of slurries containing solids in liquid suspension produced in treatments of relatively large scale capacity, such as performed in ore milling, chemical production and similar industrial operations.

The object of the filtration in operations of the aforesaid character is to make as nearly a perfect separation as possible of the solids from the liquid content. In most of such operations the filtration is accomplished by inducing a pressure on a medium supporting a quantity of such a slurry in such a way as to transpose the liquid from one side of the medium to the other. In this action the medium retains the solid particles while letting the liquid pass through its pores as well as the tortuous capillaries formed by the depositing solids. It is a well known fact that capillary action, due to surface tension, tends to make a liquid rise in a capillary and is directly proportional to the surface tension of the liquid and inversely to the diameter of the capillary. In a system of the aforesaid character, the capillary action is in direct opposition to the object of filtration since the filtration system, in effect, is trying to displace or draw liquid from these capillaries.

While all the phenomena of a filtration system of the above described character are not fully understood, the action apparently is as follows: The cake is deposited on a surface of the medium submerged in liquid, and each particle of the cake, therefore, is substantially surrounded by liquid. In the subsequent action, air displaces this surrounding liquid, and only a film or layer is left around the particle. Apparently the molecules on the surface of this film then are so situated as to contract, due to the unbalanced force in the surface molecules, thereby producing surface tension about the particle. Since these particles are in close proximity to each other their individual films are interlaced by cohesion. Further, since capillary action is due to surface tension, the aforesaid phenomena act as an impediment to the filtration action; and, in addition, their aforesaid cohesion may be a factor in blinding of the medium and certainly impedes proper cake discharge at the completion of the filtration.

Accordingly, it is an object of the present invention to provide a simple, economical, and efficient method of reducing capillary action in filtration treatments.

Another object of the invention is to provide a simple, economical, and efficient method of filtration which will reduce treatment time, accompanied by reduction in moisture content of the filter cake.

A further object of the invention is to provide a simple, economical, and efficient method of controlling the physical characteristics of a deposited filter cake to induce a more rapid separation of the cake from its supporting medium, when desired, than has been possible with the methods heretofore in use.

Still another object of the invention is to provide a simple, economical, and efficient method of filtration which reduces the frictional effect of the cake forming and discharge actions and therefore gives longer life to the materials used as the filter medium.

A still further object is to provide simple and efficient methods for obtaining optimum flocculation in conjunction with filtration treatments.

Other objects of the invention reside in the provision of novel steps and treatments all of which will be fully described in the course of the following description.

The present invention is based on the discovery that various compositions constituting the class of surface active agents may be introduced into a slurry prior to its being subjected to filtration to counteract the surface tension effect normally present in such slurry during filtration or changes in contact angle may be produced, and thereby improve the efficiency of the filtration. Such agents may be employed effectively in alkaline, acid or neutral circuits and a wide variety of compositions may be utilized in the treatment. With this understanding of the general nature of the present invention, the preferred practice of the invention will now be explained.

In ore milling treatments, for example, a concentrate product formed at a concentration stage such as flotation, jigging, or tabling is subjected to a thickening step, or sedimentation treatment to remove excess liquid from the solids content. The latter discharges from the treatment as a thickened sludge, but containing a considerable moisture content requiring removal for economical shipping of the concentrate, or prior to subjecting such concentrate product to a refining operation, such as smelting. In order to effect the moisture removal, the thickened sludge after removal from the sedimentation treatment, is passed into a filtering system of the aforesaid character. In this action a considerable part of the moisture content is removed, and the final filter cake discharging from the treatment is a moist product of low moisture content suitable for drying by various methods well known in the art.

In the preferred practice of the invention the surface active agents selected for the treatment are introduced into the feed of the thickening stage and are there mixed, and in the subsequent action obtain sufficient dispersion throughout the solids body formed therein to properly condition said body for the subsequent filtering action, although additional conditioning time is required in some treatments. An alternative arrangement is to pass the slurry and reagent mixture to a suitable flocculation treatment and then to the filter. Such operations may be performed on copper, iron, lead, zinc, silver, or gold concentrates, or, in fact, any of the concentrate products of ore milling, or similar operations. The presence of the agent in the slurry effects a considerable change in the surface tension conditions with consequent improvement of the filtering action in the regards aforementioned.

A large number of such agents have been tested and found satisfactory in the practice of the present invention, and such agents may be used alone or in combination in a given treatment. It will be understood that variations in reagent selection will be necessary, and best results depend upon the characteristics of the material being treated, the pH of the circuit and similar factors. As a general rule, to govern testing for the selection for the best reagent composition, it has been found that the aliphatic straight or branch chain amines give best results in flocculants, such as soda ash, aluminum sulfate, lime or sodium aluminate. In addition, high molecular weight aryl or alkyl complex organic compounds with one or more of the sulfate, sulfonate, amine, carboxyl, nitrogen, alcohol, ester, ether or fatty acid salt groups effectively reduce surface tension. Most of these compounds are of a type in which part of the molecule is hydrophobic and part of it is hydrophilic. Polyvalent inorganic electrolytes also possess this property and may be used in these treatments. As an example of preferred reagent compositions, it has been discovered that in alkaline circuits a mixture of an aliphatic amine chloride with a composition of the class of long chain fatty acid partial esters of hexitol anhydrides is well suited for the purpose. When a product of an acid circuit is to be treated, there is added to the reagent mixture of the above character a quantity of a high molecular weight complex organic alcohol along with an aliphatic amine chloride or an inorganic acid salt of an aliphatic organic amine.

The slurry after being conditioned in the sedimentation action with the surface active agent, is subjected to the filtering action in any of various types of filters heretofore used in such circuits, and by reason of the reduction in surface tension, a substantial reduction in the time required for the filtering treatment is attained and with a reduction in moisture content.

It has been discovered that a slurry can be overflocculated giving higher moisture content in the discharged cake and this condition also decreases the desired compression phase in the thickening step. Flocculation also increases the filter capacity and a desired floc may be obtained by the use of an adjunct reagent which does not increase the floc but which materially reduces the surface tension.

To further illustrate the practice of the present invention certain typical treatments will be cited. In the first of these a copper concentrate from Moab, Utah, was taken for treatment. This circuit is alkaline having an average pH of 9.5. The reagent used in this treatment consisted of a mixture produced in the following manner: One part of an aliphatic amine, for instance a substituted glyoxalidine, was reacted with .7% hydrochloric acid solution thereby forming an amine chloride salt. Four parts of sorbitan monolaurate were mixed with this reaction product and agitated to produce an emulsion. This reagent was introduced into the sludge in an amount equivalent to ¾ lb. reagent per ton of sludge treated, the emulsion having been diluted to approximately one part reagent to ten parts water. As a result of this reagent introduction, filtering capacity was increased from 320 lbs./sq. ft./24 hr. to 590 lbs./sq. ft./24 hr. or approximately 84%, and in addition to this increase in capacity, the moisture content in the cake was reduced from 21% to 19% while the settling rate in the thickener was materially increased.

A similar test was made on a different copper concentrate. This operation employs an acid circuit having a pH of 4.5. The amine chloride salt was formed in the same manner as in the preceding example and then mixed with four parts of a high molecular weight complex organic alcohol and agitated until a suitable emulsion was obtained. This emulsion was diluted in the proportion of one part emulsion to five parts water and fed to the treatment at the rate of ¾ lb. reagent per ton of sludge treated. As a result of this reagent introduction, the filter capacity was increased from 115 lbs./sq. ft./24 hr. to 270 lbs./sq. ft./24 hr. or approximately 143%, and in addition there was a reduction in the moisture content of the cake from 32% to 30%, and an increase in the settling rate as aforesaid.

Based on a series of tests of which the foregoing are typical, it is apparent that the filtration of any ore concentrate can be materially improved by using one or the other of the aforesaid reagent compositions, and in general best results will be obtained by using the latter reagent composition in the treatment of sludges produced in acid circuits and using the first reagent mixture in the treatment of sludges produced in alkaline circuits, although the latter reagent has been found to be effective with many of the sludges of acid circuits.

The investigations thus far undertaken have demonstrated that the amine compositions give very good flocculating results but do not produce any marked reduction in surface tension until concentration of .15% or 3 lbs. per ton is reached. Based on the present cost of such materials the use of the composition in such concentration would introduce too much of a cost factor on the filtering treatment, whereas by adding other low cost ingredients to a minor quantity of the amine the overall cost of the reagent introduction is materially reduced while obtaining equivalent, or even improved results.

It will be apparent from the foregoing examples that the present process not only benefits the filtration step but also improves the operation in the preceding and subsequent steps of the operation; thus the increase in the settling rate of the particles at the thickening stage promotes a cleaner separation and requires less treatment time to attain the separation, which has the effect of increasing treatment capacity in a thickener of a given size. Similarly the reduction in moisture content makes it possible to dry the filter cake with a lesser number of heat units.

In addition to these operational benefits, a number of advantages are attained in the filtration step. Due to the reduction in surface tension, the formed cake is more easily discharged as it has less adherence to the surface of the filter medium. Particularly in vacuum systems but also in pressure systems, less discharge air pressure is required; and this has the effect of reducing stress in the fibres of the medium and reduced friction pressure on the medium by the scraper, thereby giving longer life to the filter medium. Similarly in the cake formation action the reduced surface tension causes the cake to form more rapidly and the liquid solid separation to occur in a shorter interval.

A further benefit is derived in the filtering action from the reduction in surface tension in that there is less tendency for fine particles to be held in the interstices of the filter medium. This condition, termed blinding, occurs in most filtering operations and is the cause of frequent shutdowns. The reduction or elimination of blinding has the two-fold effect of improving filtration efficiency and of extending the operating interval between shutdowns for replacement of the filter medium.

In the foregoing description the preferred reagent compositions have been detailed. However, the process may be performed with a wide variety of compositions. In general, it must be borne in mind that reagents must be chosen which are stable at the existing pH of the slurry being treated. Non-ionic reagents may be used over a wide pH range advantageously. An example of this class of compound is the type represented by: R.CO.O.CH2.CHOH.CH2.OH where R represents a long aliphatic hydrocarbon chain. When the slurry is acid many surface active agents undergo hydrolysis, particularly those with the ester linkage. There are classes of ionic acid-stable reagents available, however, such as the type represented by:

R.CO.NH.CH2.CH2.SO2.O—+Na which give good results in the treatment, and in alkaline slurries, one of the ionic type stable surface active agents is represented by the formula: R.CO.O.CH2.CH2.SO2.O—+Na. In the above formulas, R represents an aryl or alkyl radical containing 3–20 carbon atoms.

Other compositions in the class of dispersing agents may be used to improve filtration. For example, compositions such as gum arabic, agar agar, ammonia, gelatin, glue, sodium carbonate, and sodium silicate will be effective in the treatment of some materials. However, to obtain optimum results it is advisable that the composition selected as the reagent shall contain at least one ingredient capable of reducing surface tension. Since the compositions of the class of surface active agents are suited for this purpose, it is important that some member of the class be used in sufficient quantity to materially reduce surface tension in the performance of the present process.

Since the function of the reagent in the present process is to coat the surface of individual particles of the slurry, it will be apparent that some preliminary conditioning of the slurry is desirable in obtaining adequate surface coating. Where the slurry is formed in sedimentation apparatus, best results have been obtained by introducing the reagent into the feed to such apparatus thereby utilizing the mixing action of the separation to obtain sufficient dispersion of the reagent throughout the body of particles forming the sludge. When the slurry is formed in other ways, it will be desirable to give such slurry some preliminary conditioning with the reagent before being subjected to filtration; although in operations where the slurry is subjected to some agitation as it is fed to the filter, satisfactory results can be obtained if the reagent is fed directly into the filter feed.

The process as described has been developed as an adjunct to present filtration systems and does not require the use of special equipment or of special plant arrangement in its performance. The process comprehends the use of a wide variety of compositions for different treatments, and the foregoing description has pointed out a class of compositions suited for the purpose and cited a sufficient number of the members of the class to enable operators to take advantage of fluctuation in the price of materials without impairing the efficiency of the operation. The examples of operating procedure cited in the foregoing description are intended to illustrate the practice of the invention but are not intended to limit same the scope of the invention having been clearly set forth in the hereunto appended claim.

What is claimed and desired to be secured by Letters Patent is:

The method for treating an alkaline aqueous ore pulp which includes the steps of mixing one part amine chloride with four parts sorbitan monolaurate, adding approximately three-quarters of a pound of the resulting mixture per ton of ore carried in the pulp, agitating the pulp and then mechanically filtering the pulp whereby the capillary pressure of the water in capillary channels formed between the ore particles is reduced.

C. LYNN PETERSON.

References Cited in the file of this patent

UNITED STATES PATENTS

| Number | Name | Date |
|---|---|---|
| 1,413,457 | Collins | Apr. 18, 1922 |
| 1,847,080 | Buswell | Mar. 1, 1932 |
| 1,968,793 | Bertsch | July 31, 1934 |
| 1,986,291 | Schur | Jan. 1, 1935 |
| 2,028,091 | Jaeger | Jan. 14, 1936 |
| 2,058,568 | Colbeth | Oct. 27, 1936 |
| 2,066,778 | Herbsman | Jan. 5, 1937 |
| 2,095,546 | Frick | Oct. 12, 1937 |
| 2,266,954 | Bonnet et al. | Dec. 23, 1941 |
| 2,313,741 | Engelman | Mar. 16, 1943 |
| 2,394,083 | Lintz | Feb. 5, 1946 |
| 2,437,265 | Manning | Mar. 9, 1948 |

OTHER REFERENCES

Aerosol Wetting Agents Bulletin, Am. Cyanamid and Chem. Corp., New York, p. 73, 1941.

Ind. and Eng. Chem., v. 35, January 1943, pp. 126–30.

Ind. and Eng. Chem., v. 33, January 1941, p. 18.

"Polyhydric Alcohol Esters," Glyco Pdt. Co. Inc. Bulletin, p. 13, New York.